June 23, 1964 — S. L. SEYMOUR — 3,138,467
OPHTHALMIC GLASS

Filed Jan. 8, 1962 — 2 Sheets-Sheet 1

INVENTOR.
SAMUEL L. SEYMOUR
BY
Oscar L. Spencer
ATTORNEY

June 23, 1964 S. L. SEYMOUR 3,138,467
OPHTHALMIC GLASS
Filed Jan. 8, 1962 2 Sheets-Sheet 2
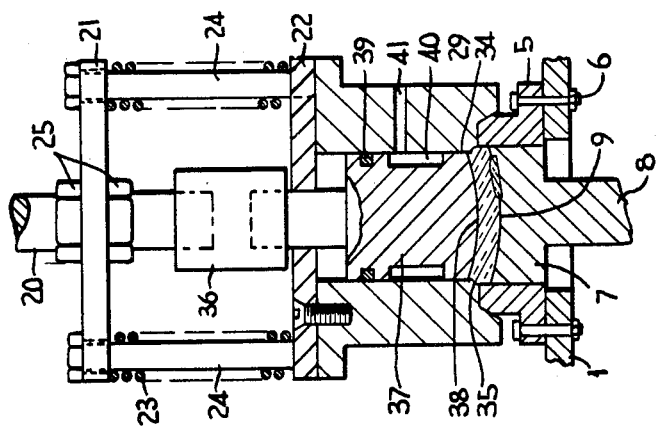
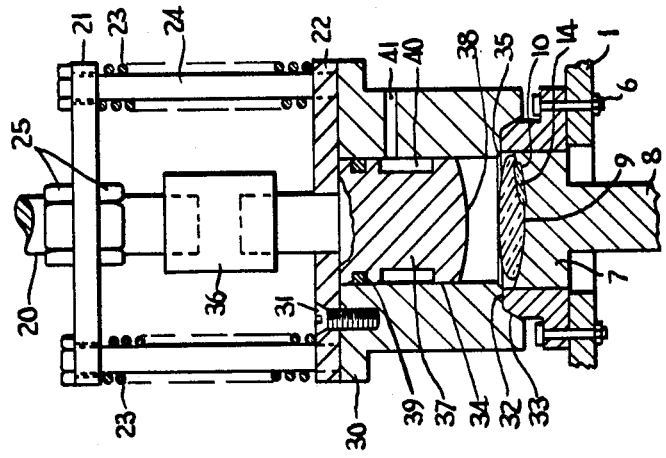
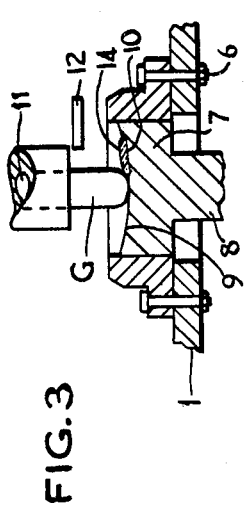
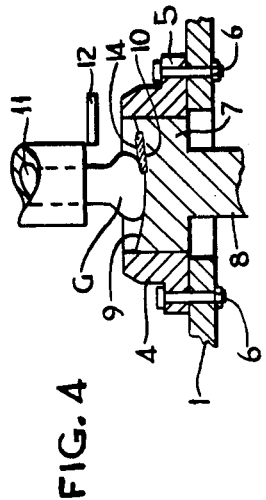
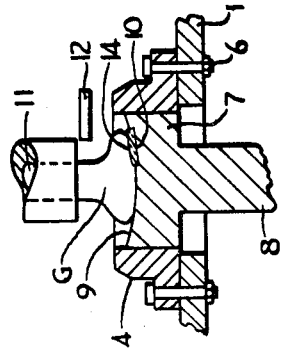
INVENTOR.
SAMUEL L. SEYMOUR
BY Oscar L. Spencer
ATTORNEY

3,138,467
OPHTHALMIC GLASS
Samuel L. Seymour, Oakmont, Pa., assignor to Pittsburgh Plate Glass Company, Pittsburgh, Pa., a corporation of Pennsylvania
Filed Jan. 8, 1962, Ser. No. 164,772
4 Claims. (Cl. 106—53)

This invention relates to a novel glass and it has particular relation to a glass useful as the major segment or crown portion of a multifocal ophthalmic lens.

A multifocal lens is formed of a major lens segment having a minor lens segment adhered in a recessed portion of the major segment. The major lens segment may be made of crown glass or other glass which is highly refined and free from seed, stria and other imperfections which would impair the optical properties of the lens. One example of a crown glass is an alkali-lime-silicate glass.

The minor segment is usualy made from highly refined glasses known as barium, lead, barium flint or barium crown glasses. The minor segment glass has a higher index of refraction than the major segment and it is the portion of the multifocal lens used for reading. The glasses of the major and minor segments preferably have the same coefficient of thermal expansion. Barium type glasses usually have a slightly lower softening point than the crown glasses and the flint glasses usually have a softening point considerably lower than the crown glasses.

In the manufacture of a multifocal lens, the minor segment is fused to the major segment. One procedure involves polishing a convex, spherical curve on the minor segment and a concave, spherically curved recess in the major segment and placing the minor segment in the recess. The major and minor segments are then sent through a special furnace to accomplish fusion of the segment. Many possible defects make it difficult to obtain high yields of satisfactory multifocal lens blanks. One defect is a tendency for numerous minute gaseous bubbles to form at the interface of this fusion during the sealing or fusing of the two glasses. The reason for the formation of these bubbles is not definitely known. Some of the bubbles may be caused by entrapment of air at the interface during fusion.

Another method of making a multifocal fusion which is designed to accomplish this fusion free from bubbles, involves placing a ground and polished minor segment lens blank in a mold and pouring the major segment glass while molten into the mold and across the exposed face of the minor segment in a manner such that the advancing molten glass sweeps any air or gases before it as it passes over the face of the minor segment and fuses to it. This method entails the use of a major segment glass having a much lower softening point, for example 100 to 150 or more ° F. lower than that of the minor segment glass. Such major segment glasses are not readily available.

The present invention is concerned with providing a glass for the major segment which has a relatively low softening point, i.e., from 1125 to 1250° F., an index of refraction, $N_D$, between 1.520 and 1.540, a reciprocal dispersion between 48 and 55 and a coefficient of expansion compatible with that of the minor segment glasses (7 to $10 \times 10^{-6}$ per ° C.). The softening point of the glass is the temperature at which the log to the base 10 of the viscosity of the glass in poises is 7.6. The novel glasses are comprised by weight of 62 to 65.8 percent $SiO_2$, 0 to 15 percent $Na_2O$, 0 to 15 percent $K_2O$, 15.2 to 20 percent PbO, 0.5 to 4 percent $TiO_2$, 0.5 to 3 percent $Al_2O_3$, 0 to 1 percent F and 0 to 2 percent $Sb_2O_5$.

The glasses of the present invention are made from conventional batch ingredients. These ingredients include sand, litharge, potassium carbonate, potassium nitrate, sodium carbonate, titanium dioxide, aluminum hydroxide, sodium silicofluoride and antimony oxide.

The following batches are exemplary:

| Batch Ingredient | Parts by Weight | | | |
|---|---|---|---|---|
| | 1 | 2 | 3 | 4 |
| Sand | 959 | 1,021 | 987 | 975 |
| Soda Ash | 86 | 171 | 239 | 330 |
| Potassium Carbonate | 205 | 143 | 72 | |
| Sodium Nitrate | 45 | 45 | 45 | 45 |
| Salt Cake | 10 | 10 | 10 | 10 |
| Sodium Antimonate | 15 | 15 | 15 | |
| Litharge | 275 | 260 | 247 | 236 |
| Aluminum Hydrate | 11 | 18 | 35 | 46 |
| Titanium Dioxide | 7 | 15 | 23 | 30 |
| Sodium Silicofluoride | | 16 | 16 | |
| Antimony | | | | 12 |

The batch ingredients are thoroughly mixed in the proportions necessary to prepare the glasses of the invention. Various size pots or crucibles may be employed and the temperatures and times of melting will vary according to the amount of glass being formed. The melting conditions herein recited may be employed to make 85 to 100 pounds of these glasses in clay pots in a furnace heated by the controlled combustion of natural gas.

The empty pot is preheated in a furnace at a furnace temperature of about 2200° F. A portion of the mixed batch is ladled into the preheated pot and the furnace temperature gradually increased. Over a period of 2½ hours the remaining portion of the mixed batch is ladled into the pot and the temperature is raised gradually to about 2600° F. The temperature of 2600° F. is maintained for about 2 to 2½ hours, during which time the batch is melted, the chemical reactions are completed and the glass becomes substantially free of bubbles. During the melting and high temperature reacting periods just described, a neutral or slightly oxidizing atmosphere is maintained within the furnace. This insures that the lead oxide is not reduced.

Stirring of the glass is begun approximately ½ hour after the glass has melted and is continued for about ½ hour while the glass is maintained at a temperature of 2500° F. The glass is stirred by mechanically propelling a refractory thimble through the glass in a circular or spiral motion. The thimble is supported by a water cooled core and a driving arm which are mounted vertically in the pot.

After the glass has become substantially free of bubbles, the temperature of the furnace is lowered in about 10 minutes to about 2350° F. and held at this temperature for about 15 minutes. The furnace temperature is then reduced gradually over 1½ hours with a stirring to about 2050° F. The pot of glass is then removed from the furnace, the glass is poured on a metal table and is rolled into the form of a plate. The plate is placed in a kiln and cooled from 1050° F. to 840° F. at the rate of about 5° F. per minute. Thereafter, it is cooled more rapidly to room temperature and may be ground and polished according to conventional plate glass manufacturing processes. Glasses made from the batches set forth above in the manner just described have the calculated compositions and properties as set forth below. In the calculations the $SO_3$ content of the glass which results from the small amount of saltcake which is used as a refining agent is omitted.

| Component | Compositions Percent by Weight | | | |
|---|---|---|---|---|
| | 1 | 2 | 3 | 4 |
| $SiO_2$ | 65.0 | 65.7 | 65.0 | 65.0 |
| $Na_2O$ | 5.3 | 8.5 | 11.4 | 14.5 |
| $K_2O$ | 9.3 | 6.1 | 3.1 | |
| $PbO$ | 18.6 | 16.6 | 16.2 | 15.7 |
| $TiO_2$ | 0.5 | 1.0 | 1.5 | 2.0 |
| $Al_2O_3$ | 0.5 | 0.8 | 1.5 | 2.0 |
| $F$ | | 0.5 | 0.5 | |
| $Sb_2O_5$ | 0.8 | 0.8 | 0.8 | 0.8 |
| Refractive index, $N_D$ | 1.529 | 1.526 | 1.530 | 1.535 |
| Reciprocal dispersion, $Nu$ | 49.7 | 50.2 | 49.4 | 48.5 |
| Softening point, °F | 1,195 | 1,165 | 1,171 | 1,212 |
| Coefficient of thermal expansion $\times 10^{-6}$ per °C. between 25°C. and 300°C. | 9.3 | 9.5 | 9.6 | 9.9 |

The amounts of the different ingredients may vary. The ranges set forth above describe approximate limitations which these variations may take and remain within the purview of the invention. For example, if lower than 62 percent by weight of $SiO_2$ is employed in the glass, it tends to make the glass chemically unstable, whereas, when amounts higher than 65.8 percent $SiO_2$ are present, difficulties are encountered in preventing formation of devitrification crystals in the glass during the cooling process in the continuous tank method of making high quality glass.

The sum total of alkali metal oxides, $Na_2O$, $K_2O$, and others, is maintained between 12 to 17 percent by weight. A minimum amount of alkali metal oxide is required to achieve the desired coefficient of thermal expansion. An excess is to be avoided, for it has a deleterious effect on the chemical durability of the glass.

It is preferred that $K_2O$ be present in the glass to prevent devitrification thereof. It has been found that the amount of $K_2O$ which is necessary to prevent devitrification is dependent upon the amount of $Al_2O_3$ and $TiO_2$ present in the glass. These latter two oxides are also required to help prevent devitrification of the glass when it is produced in an optical glass tank. The sum of $Al_2O_3$ plus $TiO_2$ in the glasses may vary from about 1 to 4.5 percent by weight of the glasses. Manufacture of the glass in an optical glass tank requires cooling the glass to a temperature at which devitrification crystals may easily form. The amount of $TiO_2$ and $Al_2O_3$ ingredients must be limited. If too much $TiO_2$ is employed, the softening point and refractive index of the glass are unduly raised. If too much $Al_2O_3$ is used, the glass is difficult to refine. This is especially troublesome when higher than 3 percent $Al_2O_3$ is present in the melt.

As stated, the presence of $K_2O$, $TiO_2$ and $Al_2O_3$ is necessary in order to prevent devitrification at the low flowing temperature for which this glass was developed. The sum of these materials may vary from about 3 to 16 percent by weight of the composition. As the amount of $TiO_2$ plus $Al_2O_3$ is greater in the glass, the amount of $K_2O$ may be less. Thus, the ratio of $Na_2O$ to $K_2O$ in the glass may be greatest when $Al_2O_3$ and $TiO_2$ are present near their maximum permissible amounts. Although it is desirous to have $K_2O$ present to help prevent devitrification, it is also desirable to have a balance of $Na_2O$ and $K_2O$. The presence of both $Na_2O$ and $K_2O$ in the glass makes it easier to control the coefficient of thermal expansion of the glass.

The presence of $PbO$ in the glasses serves two very useful purposes. It lowers the softening point. The lower softening point permits flow of the molten crown glass at a relatively low temperature over the preformed minor segment and thus minimizes the possibility of distortion of the minor segment. Too much $PbO$ makes it difficult to produce a glass having an index of refraction below about 1.54.

The presence of $PbO$ in the glass also enables the production of a glass having a relatively low reciprocal dispersion. Up to the present time, a crown type glass with a reciprocal dispersion below 55 has not been considered for making bifocal lenses by the conventional method because a high softening point was desired to prevent deformation. High softening point crown glasses are required by the optical companies making multifocal lenses and these glasses usually have reciprocal dispersions above 55. It is desired that the reciprocal dispersion of the crown glass be lower than this, preferably matching or approaching the relatively low reciprocal dispersion of the minor segment glass. A crown glass having a low reciprocal dispersion matching or approaching that of the minor segment glass aids in minimizing chromatic aberration between the crown and minor segment glass. By means of the present invention, a multifocal lens is rendered possible wherein the reciprocal dispersions of the major and minor segments match or approach each other.

The essential ingredients of the glass are $SiO_2$, $K_2O$ and/or $Na_2O$, $PbO$, $Al_2O_3$ and $TiO_2$. Other materials may be present in small amounts. These other materials may include fining agents, melting aids and other materials, such as colorants which may affect the transmission, absorption or other properties of the glass without unduly raising its softening point or harmfully affecting its desirable optical properties.

A small amount of fluorine can be added to help depress the softening point of the glass. More than 1 percent by weight of fluorine results in opacification of the glass and is therefore undesirable in this amount.

The oxides of antimony and arsenic are added as conventional fining agents. Other oxides or other compounds which act by themselves or collectively as fining agents may be employed in the practice of the invention.

The formulation of the present glasses provides major segment glasses which have an index of refraction between 1.520 and 1.540, a reciprocal dispersion of about 48 to 55, a coefficient of expansion between about 7 to $10 \times 10^{-6}$ per °C. between 0°C. and 300°C. and a softening point below 1250°F., preferably between 1250 and 1125°F. The low softening points of these glasses permits them to be poured as a molten gob into a mold and over a ground and polished minor segment glass in the mold without deformation of the minor segment.

The minor segment glasses which are suitable for use in this method of making multifocal lenses should have a coefficient of expansion between about 7 to $10 \times 10^{-6}$ per °C., between 25°C. and 300°C., an index of refraction of 1.57 to 1.67 or higher, a reciprocal dispersion below about 55 and a softening point high enough to enable it to be fused to the molten gob of major segment glass without deformation of the minor segment. When the molten gob of the novel major segment glass of the present invention is poured or pressed into fusing contact with the minor segment glass, it is desired that the softening point of the particular major segment glass be about 100°F. or more below the softening point of the minor segment glass to prevent deformation of the minor segment.

The formation of a multifocal lens by use of the glasses above described as illustrated in the drawings in which:

FIGS. 3, 4 and 5 show enlarged cross-sections of a table and main blank casting mold taken on lines III—III of FIG. 1 and illustrate a method of flowing molten glass into the mold and across one face of the segment;

FIG. 6 shows a typical section through one of the molds with the plunger ring engaging the mold;

FIG. 7 shows a similar section through the die with the plunger depressed to form the main lens blank; and FIG. 8 shows a cross-section through one form of a finished multifocal lens blank.

Figure 1:
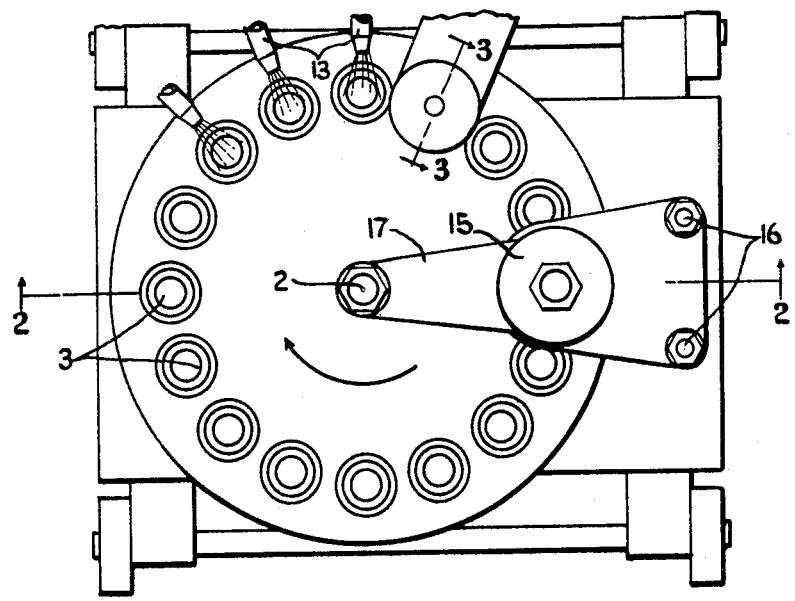
FIG. 1 shows a plan view of one form of apparatus for practicing the invention.
Figure 2:
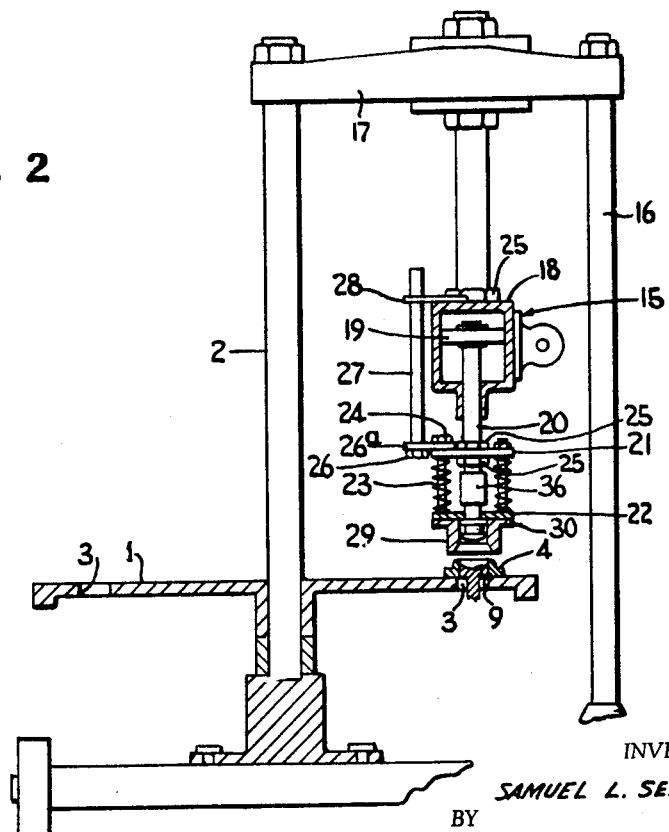
FIG. 2 shows a section through FIG. 1 taken along lines II—II thereon.

Referring now in detail to the drawings, and particularly FIGS. 1 and 2, wherein a somewhat conventional disclosure of apparatus for practicing the invention comprises a mold-supporting table 1 rotatable upon a shaft 2 and actuated by any suitable indexing mechanism (not shown). The table 1 has a plurality of openings 3 therein and each opening has associated therewith a suitable mold body 4 having flanges 5 disposed upon the table. The table and mold body flanges have suitable apertures therein to receive bolts 6 for adjustably fastening the mold body flanges 5 relative to the table. Within each table opening 3 is mounted a valve member having a head portion 7 disposed within the mold body 4 and a stem portion 8, for moving the head 7, extending below the mold body and table. The upper face 9 of head portion 7 is suitably shaped to form one face of a major lens blank. This face 9 has a suitable depression 10 therein to receive a minor segment 14 to be fused with the lens blank, as hereinafter described. Depression 10 in face 9 is of sufficient depth so that the minor segment is flush with or may project above face 9 a suitable distance for embedding the segment within the lens to a depth sufficient to permit the necessary grinding of the adjacent outer face of the lens blank and segment.

At one side of table 1 and above the plane thereof is disposed a suitable glass melting furnace having a glass discharging orifice 11 positioned above and in adjustable alignment with each valve face 9 as each mold body 4 is moved beneath the orifice 11 upon rotation of the table 1. A suitable shearing device, such as 12, is associated with glass furnace orifice 11 for cutting the stream glass issuing from orifice 11 after a suitable amount of glass has been deposited in the mold body 4, as hereinafter described. Adjacent the furnace orifice 11 and positioned to operate on mold body 4 before passing beneath the furnace orifice are heating means, such as burners 13, each arranged to direct heat into a mold body 4 and upon the minor segment 14. The number of these heating means 13 may vary according to existing conditions. Their purpose is to both clean and preheat the mold and minor segment, as hereinafter set forth.

After sufficient molten glass has been disposed in the mold body 4 and the stream of molten glass from furnace orifice 11 is severed by the shears 12, the table indexing mechanism rotates the table to position another mold body beneath the furnace orifice 11 and the previously filled mold moves toward the lens-shaping mechanism. For most glasses, the newly filled mold and glass must be allowed to cool sufficiently to permit pressing the lens to shape. For this reason the lens-shaping mechanism, indicated generally by reference character 15, is shown in FIG. 1 as being several positions beyond the furnace orifice 11.

The lens-shaping mechanism is supported above the table 1 by any suitable means such as the table shaft 2 and posts 16 which are connected adjacent their upper ends by any suitable means such as yoke 17. Adjustably suspended from yoke 17 is an air cylinder 18 having a suitable piston 19 therein and piston stem 20. Mounted on piston stem 20 is a spring-loaded support for the plunger ring comprising spaced substantially circular members 21 and 22 between which are disposed coil springs 23 and held in position by bolts 24. The bolts 24 are movably mounted in the member 21 and are attached to the member 22. The member 21 is also fixed relative to the piston stem 20 by any suitable means, such as nuts 25, disposed on opposite sides of the member 21. Attached to member 21, as by bolt 26, is a guide plate 26a having mounted therein a guide stem 27 which extends upwardly along cylinder 18 and through guide plate 28 attached to the cylinder 18 for preventing rotation of members 21 and 22. The aperture in guide plate 28 is of sufficient size to permit guide stem 27 therein to move freely vertically relative to guide plate 28.

Attached to the member 22 is a plunger ring comprising a body portion 29 terminating at one end thereof in a flange 30 which is fastened to member 22 by any suitable means such as bolts 31. The opposite end of the body portion 29 is countersunk as at 32 and provided with beveled side walls 33 for matching with the beveled head of mold member 4. The body portion 29 and flange 30 have an aperture 34 therein, which is of slightly smaller size than the opening in mold body 4, for reception of the valve member 7. Adjacent the countersink 32, the aperture 34 is enlarged by an arcuate portion 35 to an opening matching the opening in mold body 4 and provides a rounded corner to the blank. Mounted on piston stem 20 by a suitable coupling member such as 36 to allow free ways movement with respect to stem 20 is a plunger 37 which is disposed in aperture 34 of the plunger ring body portion 29. The free end of the plunger has an arcuate shaped face 38 corresponding to the face of the major lens blank. As clearly illustrated in FIG. 7, the arcuate face 38 of the plunger 37 terminates above the arcuate portion 35 of the plunger ring aperture 34. Adjacent the upper end of the plunger 37 and within the aperture 34 is a piston ring 39. Intermediate its ends, the plunger 37 is of slightly less diameter to provide an air pocket 40 which connects with an aperture 41 in the plunger ring 29. Air pocket 40 serves to distribute high pressure air from aperture 41 about the periphery of the end of plunger 37 to prevent the glass blank from adhering to the plunger. Any suitable means, such as a vacuum pick up, should be used to remove the finished blank from mold body 4.

The foregoing apparatus is one of many forms which may be utilized in practicing the invention and has been selected merely for the purpose of illustration in describing the method by which I have successfully formed a spectacle lens blank with a previously prepared minor segment fused therein in a single operation. Throughout this description I have referred to the segment as being formed of a single piece of glass having an index of refraction differing from that of the major blank. The segment may however be a multifocal one and of any desired shape which may be of several sections of glass assembled into a unitary structure by any method.

A segment 14 of the desired composition and shape is suitably ground and polished on at least one face thereof and is mounted in a mold with the polished face upward for engagement by the molten glass being deposited in the mold to form the major lens blank. The ground and polished surface or surfaces of the segment must be thoroughly clean when engaged by the molten glass and must also be preheated sufficiently to prevent fracture of the glass of the segment when so engaged. In addition thereto, the glass to form the main blank must be deposited within the mold and upon the segment in a manner which prevents trapping air upon the ground and polished surface of the segment. If this is not done the entrapped air bubbles will impair vision through the segment. It has been found by experimentation that the molten crown glass when flowed across the solid segment will in effect wipe the air from the exposed surface of the segment in advance of the molten glass infused thereto to form a complete homogeneous bond.

Although the present invention has been described with reference to specific details of certain embodiments thereof, it is not intended that such details shall be regarded as limitations upon the scope of the invention except insofar as set forth in the following claims.

This application is a continuation-in-part of my copending application Serial No. 6,630 filed February 4, 1960 and now abandoned, which is a continuation-in-part of my application Serial No. 538,516, filed October 4, 1955, and now abandoned.

I claim:

1. A glass having a softening point below 1250° F., an index of refraction between 1.520 and 1.540, a reciprocal dispersion of 48 to 55, a coefficient of thermal expansion approximating 7.0 to $10.0 \times 10^{-6}$ per ° C. between 25° C.

and 300° C. which consists essentially of the following ingredients in percent by weight: 62 to 65.8 percent $SiO_2$, 0 to 15 percent $Na_2O$, 0 to 15 percent $K_2O$, the sum of alkali metal oxides being 12 to 17 percent, 15.2 to 20 percent PbO, 0.5 to 4 percent $TiO_2$, and 0.5 to 3 percent $Al_2O_3$, the sum of $TiO_2$ plus $Al_2O_3$ being 1 to 4.5 percent and when $K_2O$ is present the sum of $K_2O$ plus $TiO_2$ plus $Al_2O_3$ being 3 to 16 percent, the above listed ingredients plus 0 to 1 percent fluorine, 0 to 2 percent refining agent and up to small amounts of colorants constituting 100 percent by weight of the glass.

2. A glass having a softening point below 1250° F., an index of refraction between 1.520 and 1.540, a reciprocal dispersion of 48 to 55, a coefficient of thermal expansion approximating 7.0 to $10.0 \times 10^{-6}$ per ° C. between 25° C. and 300° C. which consists essentially of the following ingredients in percent by weight: 62 to 65.8 percent $SiO_2$, 0 to 15 percent $Na_2O$, $K_2O$ present in sufficient amounts up to 15 percent to prevent glass devitrification, the sum of alkali metal oxides being 12 to 17 percent by weight, 15.2 to 20 percent PbO, 0.5 to 4 percent $TiO_2$ and 0.5 to 3 percent $Al_2O_3$, the sum of $TiO_2$ plus $Al_2O_3$ being 1 to 4.5 percent and the sum of $K_2O$ plus $TiO_2$ plus $Al_2O_3$ being 3 to 16 percent, the above listed ingredients plus 0 to 1 percent fluorine, 0 to 2 percent refining agent and up to small amounts of colorants constituting 100 percent by weight of the glass.

3. A glass having a softening point below 1250° F., an index of refraction between 1.520 and 1.540, a reciprocal dispersion of 48 to 55, a coefficient of thermal expansion approximating 7.0 to $10.0 \times 10^{-6}$ per ° C. between 25° C. and 300° C. which consists essentially of the following ingredients in percent in weight: 62 to 65.8 percent $SiO_2$, $Na_2O$ present in amounts up to 15 percent, $K_2O$ present in sufficient amounts up to 15 percent to prevent glass devitrification, the sum of alkali metal oxide being 12 to 17 percent by weight, 15.2 to 20 percent PbO, 0.5 to 4 percent $TiO_2$ and 0.5 to 3 percent $Al_2O_3$, the sum of $TiO_2$ plus $Al_2O_3$ being 1 to 4.5 percent and the sum of $K_2O$ plus $TiO_2$ plus $Al_2O_3$ being 3 to 16 percent, the above listed ingredients plus 0 to 1 percent fluorine, 0 to 2 percent refining agent and up to small amounts of colorants constituting 100 percent by weight of the glass.

4. A glass having a softening point below 1250° F., an index of refraction between 1.520 and 1.540, a reciprocal dispersion of 48 to 55, a coefficient of thermal expansion approximating 7.0 to $10.0 \times 10^{-6}$ per ° C. between 25° C. and 300° C. which consists essentially of the following ingredients in percent by weight: 65 to 65.7 percent $SiO_2$, 5.3 to 14.5 percent $Na_2O$, 0 to 9.3 percent $K_2O$, the sum of alkali metal oxides being 14.5 to 14.6, 15.7 to 18.6 percent PbO, 0.5 to 2 percent $TiO_2$, 0.5 to 2 percent $Al_2O_3$, and when $K_2O$ is present the sum of $K_2O$ plus $TiO_2$ plus $Al_2O_3$ being 4 to 10.3 percent, the above listed ingredients plus 0 to 1 percent fluorine, 0 to 2 percent refining agent and up to small amounts of colorants constituting 100 percent by weight of the glass.

References Cited in the file of this patent
UNITED STATES PATENTS 3,020,803    Duncan et al. _____ Feb. 13, 1962